United States Patent
Khalifeh

(10) Patent No.: US 9,644,350 B2
(45) Date of Patent: May 9, 2017

(54) SYSTEM FOR RECYCLING GREY WATER

(71) Applicant: Jack Y. Khalifeh, Marina Del Rey, CA (US)

(72) Inventor: Jack Y. Khalifeh, Marina Del Rey, CA (US)

( * ) Notice: Subject to any disclaimer, the term of this patent is extended or adjusted under 35 U.S.C. 154(b) by 216 days.

(21) Appl. No.: 14/162,531

(22) Filed: Jan. 23, 2014

(65) Prior Publication Data

US 2015/0204055 A1 Jul. 23, 2015

(51) Int. Cl.

| | |
|---|---|
| *E03B 1/04* | (2006.01) |
| *B01D 21/30* | (2006.01) |
| *B01D 36/04* | (2006.01) |
| *B01D 29/92* | (2006.01) |
| *C02F 1/00* | (2006.01) |
| *B01D 36/00* | (2006.01) |
| *E03B 1/02* | (2006.01) |
| *C02F 103/00* | (2006.01) |

(52) U.S. Cl.
CPC ............ *E03B 1/042* (2013.01); *B01D 21/302* (2013.01); *B01D 29/92* (2013.01); *B01D 36/005* (2013.01); *C02F 1/008* (2013.01); *E03B 1/02* (2013.01); *B01D 2201/54* (2013.01); *C02F 2103/002* (2013.01); *C02F 2209/42* (2013.01); *E03B 2001/045* (2013.01)

(58) Field of Classification Search
CPC ...... B01D 17/12; B01D 21/30; B01D 21/302; B01D 21/34; B01D 36/005; B01D 36/04; B01D 29/92; B01D 2201/20; B01D 2201/54; C02F 1/008; C02F 2103/002; C02F 2209/03; C02F 2209/42; E03B 1/00; E03B 1/02; E03B 1/04; E03B 1/041; E03B 1/042; E03B 1/044; E03B 1/045; E03B 1/047; E03B 2001/045; E03B 2001/047

USPC ........ 210/90, 97, 137, 138, 143, 257.1, 258; 405/37

See application file for complete search history.

(56) References Cited

U.S. PATENT DOCUMENTS

| | | | | |
|---|---|---|---|---|
| 5,106,493 | A * | 4/1992 | McIntosh ................. | C02F 1/76 210/100 |
| 6,132,138 | A * | 10/2000 | Haese ..................... | A01N 25/00 210/170.07 |
| 2004/0050429 | A1* | 3/2004 | Aylward ................. | E03B 1/04 137/597 |
| 2007/0166178 | A1* | 7/2007 | Moreland ............... | F04D 1/063 417/423.3 |
| 2008/0149141 | A1* | 6/2008 | Sales ..................... | F01D 25/002 134/22.1 |
| 2011/0024338 | A1* | 2/2011 | Milani ................... | C02F 1/001 210/96.1 |
| 2012/0199220 | A1* | 8/2012 | Knepp ................... | C02F 9/005 137/558 |
| 2013/0284679 | A1* | 10/2013 | Bailin ..................... | C02F 1/004 210/767 |

(Continued)

*Primary Examiner* — Joseph Drodge
(74) *Attorney, Agent, or Firm* — Omni Legal Group; Omid E. Khalifeh

(57) ABSTRACT

System and method of recycling grey water, and more particularly a system and method to utilize grey water resulting from a cleaning activity such as a laundry or shower as an environmentally safe form of irrigation. In accordance with one embodiment of said system, pressure sensors and transmitters in various zones may be communicatively coupled to a system controller capable of regulating the use of at least one variable frequency drive with said system.

4 Claims, 1 Drawing Sheet

(56) References Cited

U.S. PATENT DOCUMENTS

2014/0048491 A1* 2/2014 Johnson ............... C02F 1/5209
                                                    210/741
2014/0262982 A1* 9/2014 Bailin .................. C02F 9/00
                                                    210/85

* cited by examiner

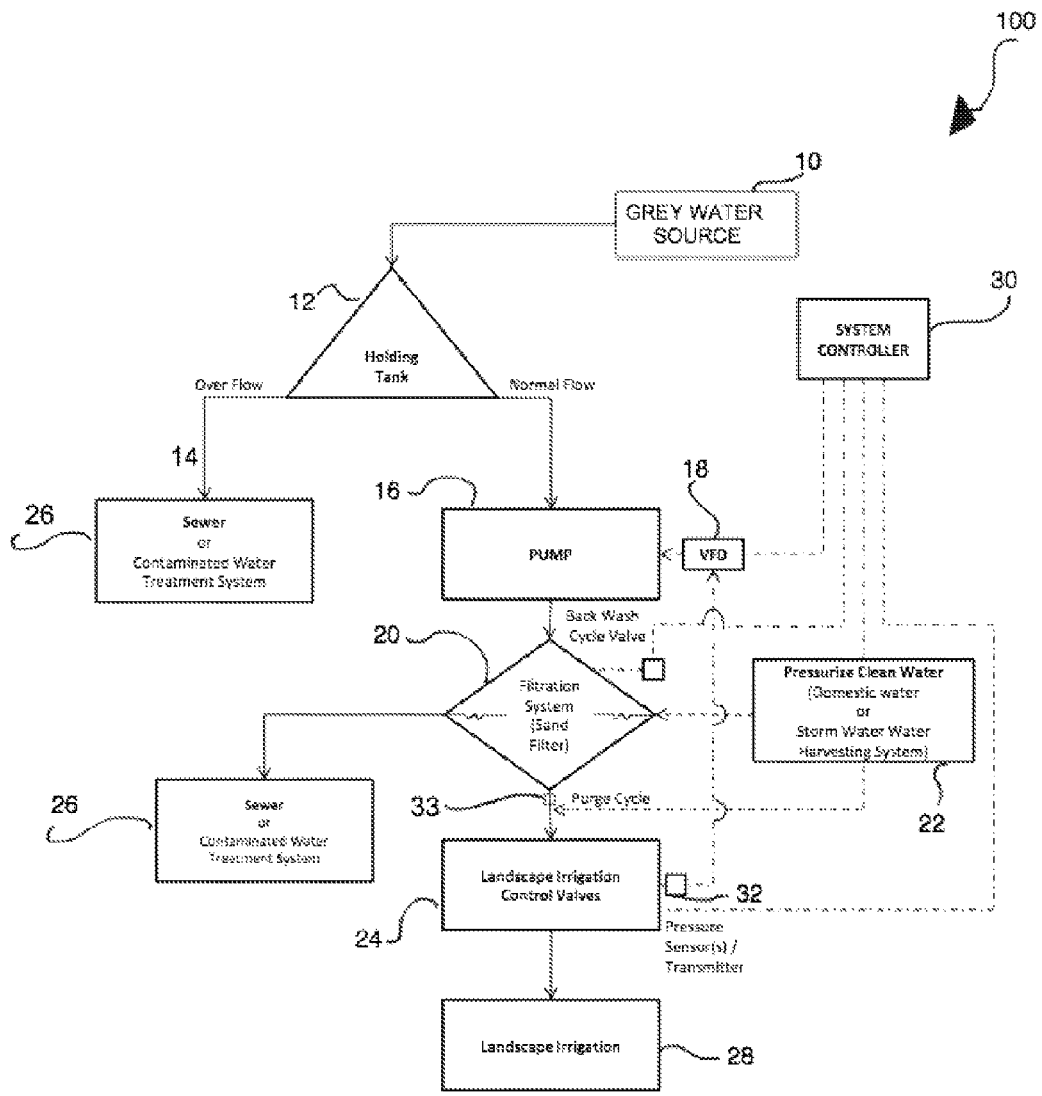

SYSTEM FOR RECYCLING GREY WATER

CROSS-REFERENCE TO RELATED APPLICATIONS

None

BACKGROUND

The following is a tabulation of some prior art that presently appears relevant:
U.S. Patents

| Pat. No. | Kind Code | Issue Date | Patentee |
| --- | --- | --- | --- |
| 5,129,758 | A | Jul. 14, 1992 | Lindstrom |
| 5,409,616 | A | Apr. 25, 1995 | Garbutt et al. |
| 6,132,138 | A | Oct. 17, 2000 | Haese |
| 8,308,937 | B2 | Nov. 13, 2012 | Milani |
| 8,377,291 | B2 | Feb. 19, 2013 | Eckman |

U.S. Patent Application Publications

| Publication Number | Kind Code | Pub. Date | Applicant |
| --- | --- | --- | --- |
| US 2012/0199220 | A1 | Aug. 9, 2012 | Knepp et al. |
| US 2012/0216881 | A1 | Aug. 30, 2012 | Donoghue, et al. |

FOREIGN PATENT DOCUMENT

None found

NONPATENT LITERATURE DOCUMENTS

None found

NOTICE OF COPYRIGHT AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

DISCUSSION OF THE RELATED ART

Effluent discharged from commercial, institutional, or residential developments may be generally classified as either black or grey water. Black water generally refers to waste water generated from toilets and garbage disposals that is directed to a septic or sewage system. Grey water, which is sometimes spelled "gray water," generally refers to waste water generated from sinks, bath tubs, showers, and clothes washers. Because black water typically contains high levels of solids and bacteria, black water may not be suitable for reuse before being processed through a wastewater treatment facility.

Grey water is effluent obtained from sources not likely to contain grease, fecal matter, or other high concentrations of bacteria such as bathtubs, showers, laundry washers, lavatory sinks, and the condensate drain from air conditioning units. Grey water normally contains small amounts of soap and detergent and is generally safe for reuse in applications where clean potable water is unnecessary.

As an alternative for treating and reusing grey water, which avoids combination with black water, treatment with aerobic bacteria by distributing grey water to a soil bed has been proposed. However, this method of treatment proven difficult due to the erosion of soil near the point of discharge, which often causes collection of grey water in large pools. Generally, collected grey water will putrefy and smell if it is left stagnant, such as typically occurs during formation of pools in eroded soil beds.

However, because grey water typically contains relatively small amounts of solids, bacteria, soaps, and detergents, grey water may be processed within a short period of time through a simple filtering system to be safe for non-potable reuse, such as outdoor irrigation. The positive environmental impact and the scarcity of water in various parts of the world, have made grey water diversion systems a welcomed addition to commercial, institutional, and residential developments all over the world.

Even though various methods dealing with and using grey water have been proposed in the past, all of the those heretofore known suffer from a number of disadvantages:
 (a) the past methods did not effect the amount of waste water dumped into the sewers;
 (b) they do not utilize all recyclable water sources as a means of irrigating the landscape around a given building and thereby reduce irrigation costs;
 (c) the known methods are not all applicable in commercial, institutional, and residential buildings;
 (d) they make waste of the desirous properties of grey water for landscape irrigations which include lower overall chlorine content than fresh water and other nutrients which may benefit the flora and soil;
 (e) they do not effect the amount of chemicals necessary to treat sewage water;
 (f) they use considerably more energy than the than applicant's system; and
 (g) many of the grey water systems heretofore known do not comply with current United States uniform plumbing codes.

The incorporation and all of these benefits can occur in either a micro application for an individual residence or a macro application for an entire development. As will be described in more detail below the grey water recycling invention disclosed allows for an energy efficient, low maintenance, flexible and varied approach to several problems facing property owners and managers while additionally promoting the recycling of a scarce natural resource.

Although various approaches to recycling grey water have been proposed, none of the foregoing combine the characteristics of the present invention:

WO/2007/040394 relates to a device for reusing grey water and a method of siphoning water from a collecting reservoir to a storage tank. WO/2006/005118 relates to a modular water treatment apparatus having cells arranged in a treatment bed. US 2005/0205479 relates to a grey water recycling apparatus having a filter that when clogged is manually cleaned by brushing, reconnecting for reverse flow, or by removal. WO/2004/057119 relates to a grey water recycling system consisting of one or more tanks which is operating automatically and recycles grey water from a washing machine and uses grey water accumulating only within the same household.

Therefore, there is a need for a new system and method for distributing grey water within a soil bed which will overcome or eliminate the aforementioned problems. The present invention effectuates these needs.

SUMMARY

The present invention relates to systems and methods for efficient water recycling and energy conservation, reclaiming and efficiently reusing waste water. The invention provides systems, devices and methods for water recycling. Among other things, this disclosure provides an apparatus for reclaiming, purifying, and recycling grey water to be used to irrigate the landscape in or around the commercial or residential development turning the purified water into grey water.

In one embodiment, a method and apparatus to recycle grey water, and more particularly a method and apparatus to utilize grey water resulting from a cleaning activity such as a laundry, bathtubs, and showers as an environmentally safe form of irrigation. In accordance with one embodiment of said irrigation, said grey water may be used to irrigate the landscape on and around commercial and residential developments.

In a broad aspect the method comprises one or more grey water sources, a means of storing the same, a pumps, and a means of filtration prior to use as an irrigation means. The system further comprises a means of collecting data regarding water pressure in a particular zone. Any given zone may be comprised of a valve, or series of valves, located in a common geographic location sharing common properties such as elevation and/or distance from said pump. The data collected from a particular zone may then be transmitted, collected, and stored on control panel.

A system controller including a control panel is the means through which a user may regulate the system. Using inputs from the user regarding particular landscape irrigation needs, the control panel may be used to regulate the parameters in which the system must operate.

Said system controller may be capable of following and adjusting a preset watering schedule or creating one of its own. The system controller may interact with a variety of devices, including a water level sensor and controller, filter(s), pump(s) or gravitational outlet valves, at least one zone valve, at least one potable water valve, and weather stations, rain sensors, moisture sensors and other sensing devices.

When a watering is scheduled, and the grey water collected in the tank has reached a first predetermined minimum level, the system controller begins a may be programmed to begin a grey water irrigation cycle to at least one zone in the landscape.

The system controller ends the grey water irrigation cycle when the watering schedule is complete, or when the grey water within the tank falls to a predetermined level. The system controller may finish the watering schedule when sufficient grey water is available again.

In one embodiment of the system for recycling grey water, said pump may comprise a Variable Frequency Drive (VFD). Said VFD may control the pumps motor speed and torque by varying motor input frequency and voltage to meet desired pressure at a given zone/valves(s).

ADVANTAGES

Thus several advantages of one or more aspects are to provide a method and apparatus for recycling grey water that:

(a) reduces the quantity of waste water deposited into the sewer;
(b) reduces irrigation costs by reusing water that has already be brought to the premises;
(c) reduces the amount of fresh water necessary to irrigate a given property;
(d) grey water contains nutrients not found in freshwater which benefit the flora and soil;
(e) benefits the soil because grey water has a lower overall chlorine content than fresh water;
(f) reduces the amount of chemicals and energy used in the overall process of sewage treatment;
(g) the grey water will be filtered by the soil and therefore lead to reduced levels of phosphates and nitrates entering local river, lakes, and oceans. This will in turn reduce algal blooms which threaten sea life with anoxic conditions;
(h) reduction in irrigation cost can lead to significant reduction in water cost for the inhabitants and owners of a given property;
(i) can be incorporated in commercial, institutional, and residential developments;
(j) reduces the amount of waste channeled to waste water treatment facilities;
(k) reduces all associated sewage discharge disposal fee;
(l) is low maintenance; and
(m) is energy efficient.

These and other advantages of one or more aspects will become apparent from consideration of the ensuing description and accompanying drawings. Although the description above contains many specificities, these should not be construed as limiting the scope of the embodiments but as merely providing illustrations of some of several embodiments. Thus the scope of the embodiments should be determined by the claims that are appended and their legal equivalents, rather than by the examples given.

The description of the invention which follows, together with the accompanying drawings should not be construed as limiting the invention to the example shown and described, because those skilled in the art to which this invention pertains will be able to devise other forms thereof within the ambit of the appended claims.

DESCRIPTION OF THE DRAWINGS

For a more complete understanding of the present disclosure, reference is now made to the following brief description, taken in connection with the accompanying drawing, reference numerals, and detailed description.

The FIGURE is a schematic drawing grey water recycling system according to some embodiments of the present invention which can be applied to both residential, institutional, and commercial property embodiments of the present invention.

DETAILED DESCRIPTION

Illustrative embodiments of the invention are described below. The showings are for purposes of illustrating preferred embodiments and not for purposes of limiting the same. The following explanation provides specific details for a thorough understanding of an enabling description for these embodiments. One skilled in the art will understand that the invention may be practiced without such details. In other instances, well-known structures and functions have not been shown or described in detail to avoid unnecessarily obscuring the description of the embodiments.

With reference to The FIGURE, a block diagram is used to illustrate a system for recycling grey water 100 according to some embodiments of the present invention. Said system 100 can be applied to both residential, institutional, and commercial property embodiments of the present invention. Although the FIGURE illustrates the primary elements of the system 100, the system 100 may also include any number and types of pipes, tubes, and/or connectors to connect the main elements of the system 100.

The system 100 comprises a grey water source 10 and at least one holding tank 12 with at least one grey water inlet and at least one sewer outlet. The system in the FIGURE further comprises contaminated water 14, a pump(s) 16, a variable frequency drive (VFD) 18, a filtration means 20, pressurized clean water 22, landscape irrigation control valve 24, contaminated water treatment means 26 such as a public sewer or private black water treatment system, as well as landscape 28 which to irrigate and a system controller 30 for, among other things, regulating the on-off schedule of the system 100, the VFD 18 and the pump 16, as well as a pressure sensor and transmitter 32.

The grey water 10 may be supplied from a number of sources including, but not limited to, the waste water generated from sinks, bath tubs, showers, and clothes washers. This water is stored in a holding tank 12 for use by the system 100 or to be ejected into the sewer (which may be public or private) or other contaminated water treatment system should grey water 10 levels surpass a preset point or otherwise can no longer be contained in the holding tank 12.

In one embodiment of said tank 12, the tank 12 may further comprise an overflow drain. Said overflow drain operative to discharge excess grey water 10 to the sewer or black water treatment system.

The size of the tank(s) 12 may vary depending upon the application. By way of example, and not limitation, a large commercial building or a residential apartment complex containing a relatively large number of grey water sources may require a larger tank or tanks than the size needed for a single-family home. The size of the landscape 28 to be irrigated also may affect the tank size. A smaller tank size may allow easier installation, especially where space for the tank is limited. However, a smaller tank may not allow optimization of the grey water to actual irrigation needs. The tank(s) 12 may be located inside or outside. If outside, the tank(s) 12 may be above ground, but preferably the tank is subsurface. Subsurface tanks avoid the need to replace plants or other usable landscape areas with a tank storage area that may require aesthetically-pleasing landscaping to disguise them. Subsurface tanks also may help avoid emission of unpleasant odors or noise that may be associated with storing and delivering the grey water 10.

Connected to the tank 12 is a first reservoir inlet conduit which is used for inputting grey water 10 from sources within dwelling into the tank 12. Particularly, said inlet conduit is interfaced via lines and to the drains of household devices such as bathtubs, sinks, dishwasher, and clothes washers.

The tank(s) 12 may also contain a sewer outlet. If the grey water 10 ever completely fills the tank(s) 12, but no irrigation is needed, the grey water 10 flows out of the tank(s) 12 via the sewer outlet into a sewage line. The sewage line may drain into the local sewer system, a septic system, or another subsurface-type passive irrigation system. The sewage line also may have an optional check valve or other back-flow prevention device to prevent sewage from flowing into and contaminating the contents of the tank(s) 12.

The system for recycling grey water 100 further comprises a pump(s) 16, sometimes referred to as a sewage ejector(s), which is communicatively coupled to a system controller 30. Said system controller 30 comprises information about the irrigation needs of the landscape surrounding the system 100 and regulates the systems 100 activity to effectuate those needs most efficiently. This information may include, but is not limited to, information about required pressure or required pump frequency the pump needs to deliver the required flow and pressure at each zone.

In another embodiment, the pressure sensor/transmitter 32, pump 16, VFD 18 with a pump controller that modulates the VFD speed to maintain constant specified pump discharge pressure to be one system. And the system controller 30 may be programmed to provide the required pump discharge pressure for each zone to the pump controller. The require pressure at the pump discharge for each zone will be based on calculating what the required pressure at pump discharge has to be (taking into account the elevation differences and piping pressure losses etc.) in order to maintain desired pressure at zone valve.

In practice, it is possible that the grey water available, the storage capacity for the grey water, and the landscape watering requirements may not exactly match. To account for such variances, a system controller 30 is provided that may monitor the water level of single or multiple tanks and may make decisions about which water source to use for irrigation needs. In one embodiment, a separate controller may be used. Additionally, the system controller 30 may make irrigation and water source decisions based on external factors, such as economic tariffs or credits imposed or applied by a water purveyor and provide information regarding the pressure at zone valve(s) to the variable frequency drive for the pump to operate very efficiently.

The aforementioned pump 16 moves the grey water 10 from the tank 12 via a grey water outlet (not shown) into an irrigation supply line. In one embodiment of the present invention, the grey water supply line (not shown) near the grey water outlet may optionally have a check valve for preventing back-flow of clean pressurized water into the tank. In one embodiment, a grey water flow meter 33 may also be included in order to measure the amount of grey diverted from the public or private sewer system. The irrigation supply line delivers the grey water to one or more irrigation zones covering the landscape 28. The system controller 30 may direct which irrigation control valves 24 are to be opened and when to close them. The aforementioned may help reduce the sewer fees charged by the utility company. In one embodiment, the zone valve may contain a pressure sensor.

The system controller 30 activates a zone by opening a zone control valve for that particular zone. A landscape may be divided into multiple zones to optimize water use such that each zone receives the amount of water that is best suited for the plants and conditions in it or to ensure that there is sufficient pressure to effectively run the watering devices of the activated zone.

The pump 16 is activated whenever there is a call for grey water 10 from the system controller 30 requesting grey water 10 to irrigate the landscape on or around the system 100. The pump 16 may further comprise a start stop functionality to be controlled by said system controller 30. The time period and frequency during which each landscape irrigation control valves(s) 24 is open and active, rain/moisture sensor, time clock features, programmed time period for backwash cycle, which solenoid valves are opened and closed, and the required pump speed (RPM) for each zone to operate properly may also be regulated by system controller 30.

The pump 16 may further comprise a motor and means of regulating the same. In one embodiment said means may be a variable frequency drive (VFD) 18. The VFD 18 is operative to control the speed of the pump's motor. The VFD 18 may vary the speed of the motor and thereby vary the pump flow rate and discharge pressure to maintain the desired pressure at the zone valve(s).

In a preferred embodiment the VFD 18 is communicatively coupled to the system controller 30. The system controller collects data from pressure sensors and transmitters which may be used to cause the VFD 18 to output an optimum frequency that causes the motor to operate at substantially the lowest usage of energy to pump grey water from the holding tank(s) 12 to the landscape 28. The system controller may also contain information about the required pump speed for operation of each zone.

On it's way to be used as landscape 28 for irrigation the grey water 10 may first pass through at least one landscape irrigation control valve 24 sometimes referred to as a irrigation solenoid zone valve. Each valve 24 or series of valves, in a particular geographic location, makes up a pressure zone. Such zones may be comprised of valves 24 at similar elevations or similar distances away from the pump 16.

In one embodiment of the system for recycling grey water 100, said system 100 may comprise at least one manifold that directs grey water 10 from the pump 16 towards at least two landscape irrigation control valves 24.

At least one pressure sensor and transmitter 32 shall be installed as part of the system 100. Said sensor/transmitter 32 to be located at each pressure zone (determined either by elevation changes and distance of zone valves from the pump) just before the grey water landscape irrigation control valve or at the manifold that feed's several grey water landscape irrigation solenoid control valves. Such a sensor/transmitter 32 shall be capable of taking readings of water pressure at a particular zone.

In the embodiments where manifolds are used to direct grey water 10 to the landscape irrigation control valves 24, said pressure sensor and transmitter 32 may be installed after the pump 16, just before the manifold, in order to most effectively take and report pressure readings in a given geographic location or zone.

The signal transmitted from each pressure sensor 32 is relayed back to the system controller 32 which may modulate the speed at which the pump 16 is operating via the VFD 18 in order to achieve a desired pressure at a given sensor location, manifold, or zone. The desired pressure may be input into the system controller 30 by a user based on his or her desired irrigation schedule or zone pressure requirement.

The set pressure shall be adjusted so that the pressure at the irrigation solenoid control valves does not exceed the pressure allowed by local plumbing or grey water code (generally around 20 PSI). This will considerably reduce that energy usage of grey water pump 16.

In another embodiment, the system 100 may further comprise rain and/or moisture sensor (not shown). Said rain/moisture sensors collect data which may be relayed to the control panel. Once the data is collected and stored, a user may input desired system activation schedules based on said information.

It is further envisioned that the system controller 30 may be used to input desired backwash cycle period and purge cycle period. A purge cycle can be understood as the periodic introduction of pressurized clean water downstream of water filtration means 20 to purge or clean the system piping and/or emitters. In one embodiment, the system controller 30 may also control selective bypass of certain grey water sources when the tank(s) 12 is full, but no irrigation is required.

FIG. 1 further illustrates how the grey water recycling system 100 may further comprise a filtration means 20. In this embodiment, the grey water 10 discharged from the aforementioned pump 16 may pass through the filtration means 20 in order to remove unwanted contaminants that could plug the lines and/or emitters and/or be harmful to the landscape 28. A variety of different filters may be used to further this objective. The filtration means 20 may be any known in the art that is capable of removing debris typically found in grey water (lint, hair, paper scraps, large detergent particles, etc.) to ensure that the irrigation system does not clog. The filter also may be easily cleaned and/or replaced. In one embodiment of the filtration means 20 said filter may be a sand filter with automatic back wash capability.

The system 100 may periodically run a purge cycle. During this process, pressurized clean water 22 is introduced downstream of the filtration means 20 to purge or clean the system piping and/or the emitters and use pressurized clean water to irrigate the landscape 28 when grey water is not available (such as when the tank is empty).

Grey water discharged from the irrigation control solenoid valves discharges to supply water landscape irrigation field thru distribution tubing and grey water emitters Said emitters shall be suitable for use for grey water system 100.

CONCLUSIONS, RAMIFICATIONS, AND SCOPE

While a particular form of the invention has been illustrated and described, it will be apparent that various modifications can be made without departing from the spirit and scope of the invention. For example, the system may be comprised of one zone with a single pressure sensor and transmitter even though the inventor contemplates the possibility that the system may comprise a plurality of zones with multiple sensors/transmitters or multiple pumps. Accordingly, is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being refined herein to be restricted to any specific characteristics, features, or aspects of the system for recycling grey water with which that terminology is associated. In general, the terms used in the following claims should not be constructed to limit the system for recycling grey water to the specific embodiments disclosed in the specification, unless the above description section explicitly define such terms. Accordingly, the actual scope encompasses not only the disclosed embodiments, but also all equivalent ways of practicing or implementing the disclosed system. The above description of embodiments of the system for recycling grey water is not intended to be exhaustive or limited to the precise form disclosed above or to a particular field of usage. While specific embodiments of, and examples for, the system are described above for illustrative purposes, various equivalent modifications are possible which those skilled in the relevant art will recognize.

While certain aspects of the system for recycling grey water are presented below in particular claim forms, the inventor contemplates the various aspects of the system in any number of claim forms. Accordingly, the inventor reserves the right to add additional claims after filing the application to pursue such additional claim forms for other aspects of the system for recycling grey water.

What is claimed is:

1. A system for recycling grey water comprising:
   at least one source of grey water;
   a grey water supply line for delivering said water from the at least one source to a tank;
   a pressure source for moving said grey water out of said tank;
   a variable frequency drive for controlling the rate at which said pressure source moves said grey water from said tank;
   at least one irrigation supply line for delivering said grey water from said tank to at least one emission device;
   at least one pressure sensor connected to said irrigation supply line collecting information about the pressure of said grey water in a particular zone, each zone defined by a geographic location corresponding to a particular portion of landscape subject to irrigation and each sensor and communicating said information to a centralized system controller; and
   said centralized system controller communicatively coupled to the variable frequency drive and pressure sensor;
   wherein the system controller is operative to automatically end delivery of grey water during an irrigation cycle, the cycle defined by the duration of delivery of grey water from said tank to the at least one emission device, when grey water within the tank falls to a predetermined level.

2. The system of claim 1, further comprising a filtration means, said filtration means located on said grey water supply line.

3. The system of claim 1 further comprising a filtration means, said filtration means located on said grey water supply line.

4. A system for recycling grey water comprising:
   at least one source of grey water;
   a grey water supply line for delivering said water from the at least one source to a tank;
   a pressure source for moving said grey water out of said tank;
   a variable frequency drive for controlling the rate at which said pressure source moves said grey water from said tank;
   at least one irrigation supply line for delivering said grey water from said tank to at least one emission device;
   at least one pressure sensor connected to said irrigation supply line collecting information about the pressure of said grey water in a particular zone, each zone defined by a geographic location corresponding to a particular portion of landscape subject to irrigation, and each sensor further programming the required pump speed that said pump should operate for said zone; and
   a centralized system controller communicatively coupled to the variable frequency drive and pressure sensor;
   wherein the system controller is operative to automatically end delivery of grey water during an irrigation cycle, the cycle defined by the duration of delivery of grey water from said tank to the at least one emission device, when grey water within the tank falls to a predetermined level.

* * * * *